United States Patent
Lu

(10) Patent No.: US 7,279,944 B2
(45) Date of Patent: Oct. 9, 2007

(54) CLOCK SIGNAL GENERATOR WITH SELF-CALIBRATING MODE

(75) Inventor: Chao-Hsin Lu, Dayuan County (TW)

(73) Assignee: Realtek Semiconductor Corp., HsinChu (TW)

(*) Notice: Subject to any disclaimer, the term of this patent is extended or adjusted under 35 U.S.C. 154(b) by 0 days.

(21) Appl. No.: 11/268,505

(22) Filed: Nov. 8, 2005

(65) Prior Publication Data

US 2006/0097767 A1 May 11, 2006

(30) Foreign Application Priority Data

Nov. 9, 2004 (TW) .............................. 93134147 A

(51) Int. Cl.
*H03L 7/00* (2006.01)

(52) U.S. Cl. ................. 327/152; 327/153; 327/154; 327/271; 327/270

(58) Field of Classification Search ............... None
See application file for complete search history.

(56) References Cited

U.S. PATENT DOCUMENTS

| 5,321,728 | A | * | 6/1994 | Andrieu ................ 375/354 |
| 5,694,377 | A | * | 12/1997 | Kushnick .............. 368/120 |
| 5,801,559 | A | * | 9/1998 | Sawai et al. ........... 327/116 |
| 6,055,287 | A | * | 4/2000 | McEwan ................ 375/376 |
| 6,819,729 | B2 | * | 11/2004 | Takagi .................. 375/376 |
| 6,975,173 | B2 | * | 12/2005 | Marbot et al. .......... 331/1 A |
| 7,026,850 | B2 | * | 4/2006 | Atyunin et al. ......... 327/158 |
| 7,035,366 | B2 | * | 4/2006 | Tokutome et al. ....... 375/371 |
| 7,071,746 | B2 | * | 7/2006 | Suda et al. ............ 327/158 |
| 2002/0140472 | A1 | * | 10/2002 | Sonobe ................. 327/158 |
| 2006/0029175 | A1 | * | 2/2006 | Schnarr ................ 375/376 |

* cited by examiner

*Primary Examiner*—Tuan T. Lam
*Assistant Examiner*—William Hernandez
(74) *Attorney, Agent, or Firm*—Winston Hsu

(57) ABSTRACT

A clock signal generator and method thereof are provided for a system to generate an output signal. The apparatus comprises: a delay circuit for generating a delayed clock with a first time, a delay module for generating delayed signal(s), and a decision circuit for comparing the delayed signal(s) with the delayed clock to obtain the relative relation between the delay time and the first time and controlling a delay time of an input signal according to the relative relation to generate the output signal.

20 Claims, 7 Drawing Sheets

CLOCK SIGNAL GENERATOR WITH SELF-CALIBRATING MODE

CROSS-REFERENCE TO RELATED APPLICATIONS

This non-provisional application claims priority under 35 U.S.C. § 119(a) on Patent Application No(s). 93134147 filed in Taiwan, R.O.C. on Nov. 9, 2004, the entire contents of which are hereby incorporated by reference.

BACKGROUND

1. Field of the Invention

The invention relates to a clock signal generator and method thereof, in particular, to be used for adjustment.

2. Related Art

In the process of data transmission, it is essential to keep the output data signal in synchronization with the system clock. However, when the data or clock signal is transmitted via the printed-circuit-board (PCB), it is usually coupled to generate noise. Further, the optimal latch phase is shortened due to the jitter of the signal itself and the time skew caused by the different lengths of the signal wires on the PCB. That is, the latch duration between the data and the data strobe signal (DOS) is reduced. Therefore, the generation of a better and appropriate phase for latching the data, especially for the application in high-speed circuits, has become an extremely important task in the research of this field.

With regard to the clock signal generator of the prior art, please refer to FIG. 1, wherein the conventional clock signal generator comprises a delay locked loop (DLL) 110, a delay module 120, and a multiplexer 130. The delay lock loop 110 has a voltage controlled delay line (VCDL) 118 formed by a plurality of voltage controlled delay cells 119 connected in series. The delay module 120 has a plurality of VCDLs. When the system clock CKi is inputted to the DLL 110, the DLL 110 generates a voltage control signal Vc for supplying to each VCDL of the delay module 120. The voltage controlled delay cell 122 of the VCDL of the delay module 120 is substantially the same as the voltage controlled delay cell 119 in the DLL 110. That is, these voltage controlled delay cells 119, 122 have substantially the same characteristics relative to the voltage control signal Vc. As such, the output clock CKo is kept latched on the system clock CKi, and then the output data signal and the system clock is maintained in synchronization is achieved.

Furthermore, as shown in FIG. 2, the DLL 110 may be replaced by a phase locked loop (PLL) 210. Referring to FIG. 2, in this case, the clock signal generator comprises: a PLL 210, a delay module 220 and a multiplexer 230. The PLL 210 has a voltage controlled oscillator (VCO) 218.

However, the delay time of the voltage controlled delay cells of the delay module are controlled by the voltage control signal $V_C$. Thus, the DLL or PLL must consistently consume power. Further, the areas occupied by the voltage controlled delay cells of the delay module are much larger.

SUMMARY

Accordingly, the present invention is related to a clock signal generator and method thereof to substantially solve the problems in the prior art.

Accordingly, the present invention is related to a clock signal generator and method thereof to reduce power consumption.

Accordingly, the present invention is related to a clock signal generator and method thereof to accurately lock on the data signal.

To achieve the above-mentioned object, the clock signal generator is provided, comprising: a delay circuit for generating a delayed clock with a first time, a delay module for generating at least one delayed signal(s), and a decision circuit for comparing the at least one delayed signal(s) with the delayed clock to obtain the relative relation between the delay time and the first time and controlling a delay time of an input signal according to the relative relation to generate the output signal.

Herein, the delay signals generated by the delay module have substantially the same delay time, or have substantially the same frequency but substantially different phases.

Besides, when the system enters into the working mode during data transmission, an accurate phase or the delayed clock is generating based on the delayed phase and the phase to be delayed, to precisely lock on data or input/output data. Moreover, the delay circuit is shut down after the adjustment, to save power consumption.

In addition, the clock signal generator and method thereof according to the invention executes the adjustment procedure at every predetermined time interval, to avoid the impact of temperature on each of its components.

BRIEF DESCRIPTION OF THE DRAWINGS

The invention will become more fully understood from the detailed description given below, which is for illustration only and thus is not limitative of the present invention, wherein.

DETAILED DESCRIPTION

Figure 1:
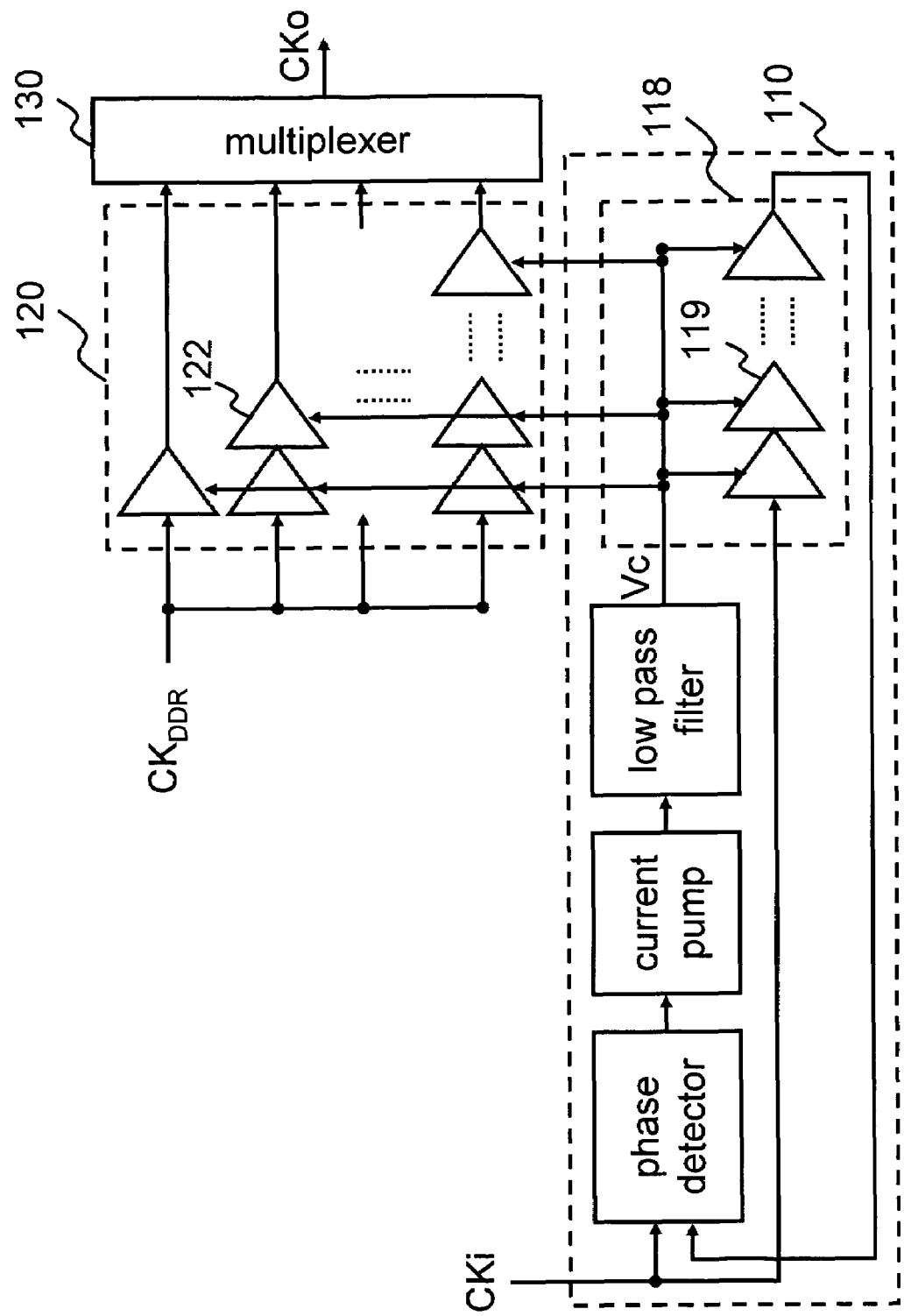
FIG. 1 is a system structure diagram of the conventional clock signal generator.
Figure 2:
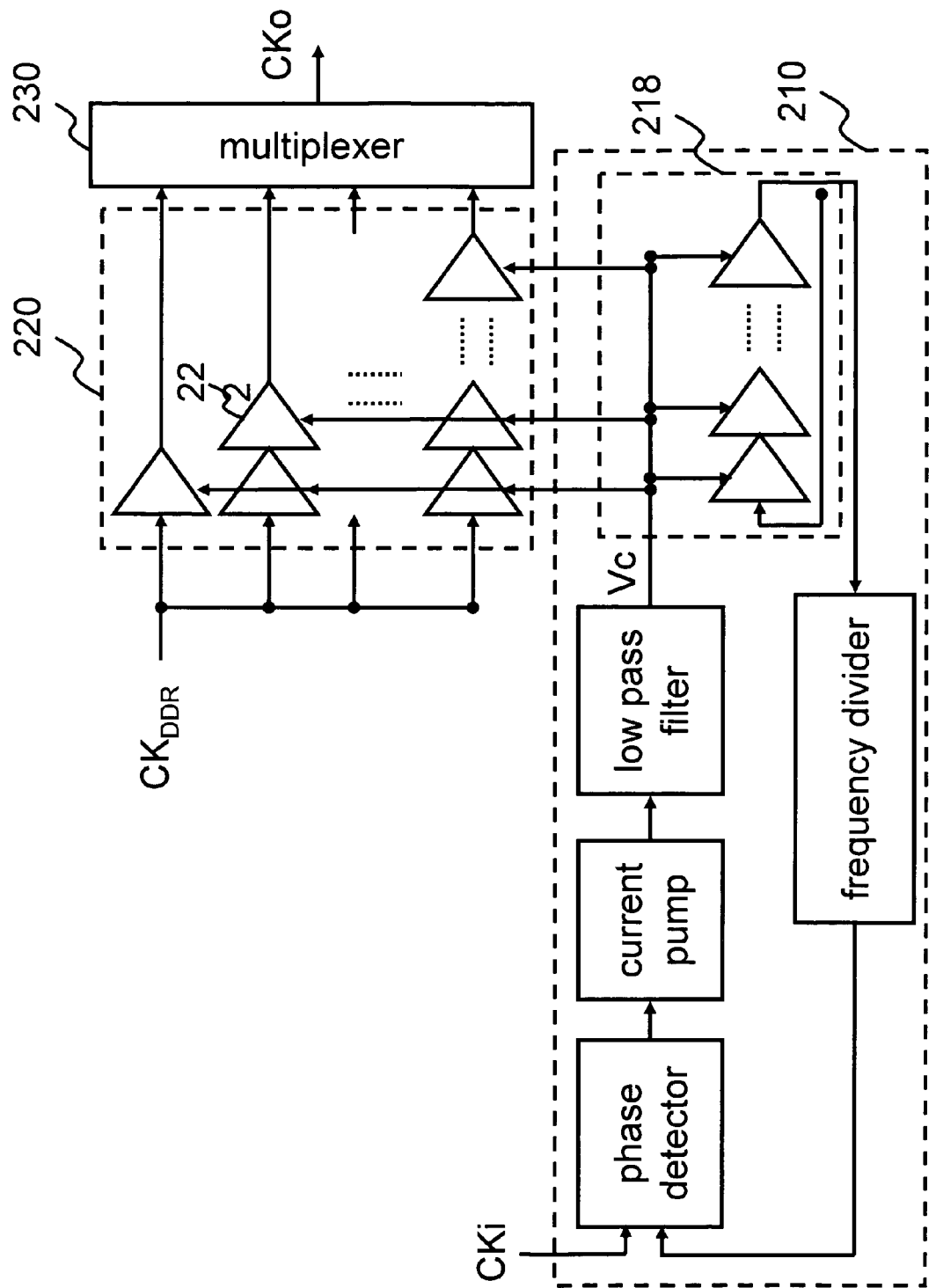
FIG. 2 is a system structure diagram of another conventional clock signal generator.
Figure 3:
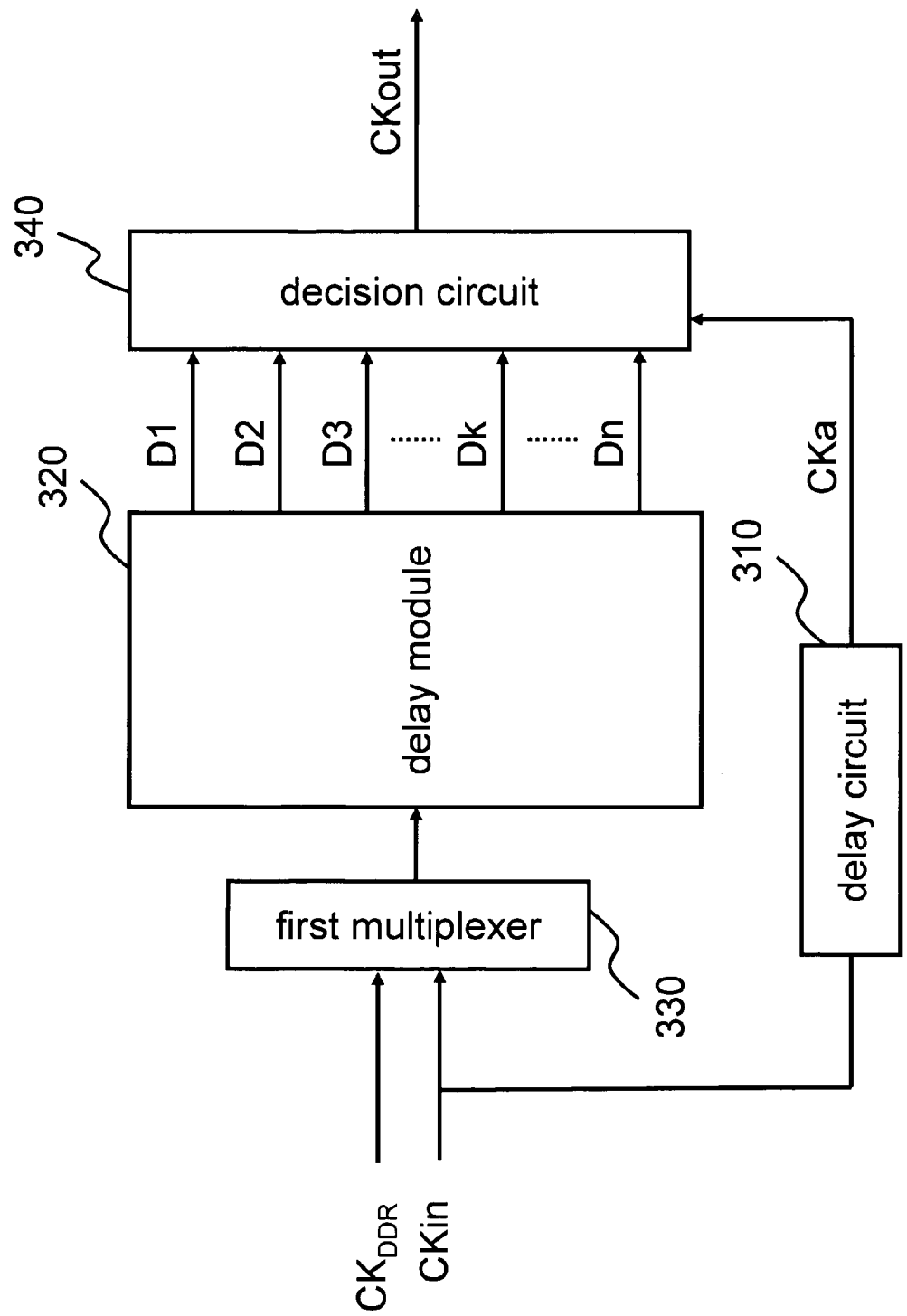
FIG. 3 is a system structure diagram of the clock signal generator according to an embodiment of the invention.

Refer to FIG. 3, which shows the clock signal generator according to an embodiment of the invention. In this case, the clock signal generator comprises: a delay circuit 310, a delay module 320, and a decision circuit 340.

The delay circuit 310 receives a reference signal CKin and delays the reference signal Ckin for a phase difference to generate a delayed clock CKa, which is known its delay time. That is, the reference signal CKin is delayed for a predetermined phase to generate the delayed clock CKa. Herein, the delay circuit 310 can be a delay locked loop (DLL), a phase locked loop (PLL), or any other device capable of delaying a known delayed phase difference or a known delay time. In an embodiment, the reference signal CKin is a system clock.

Figure 4:
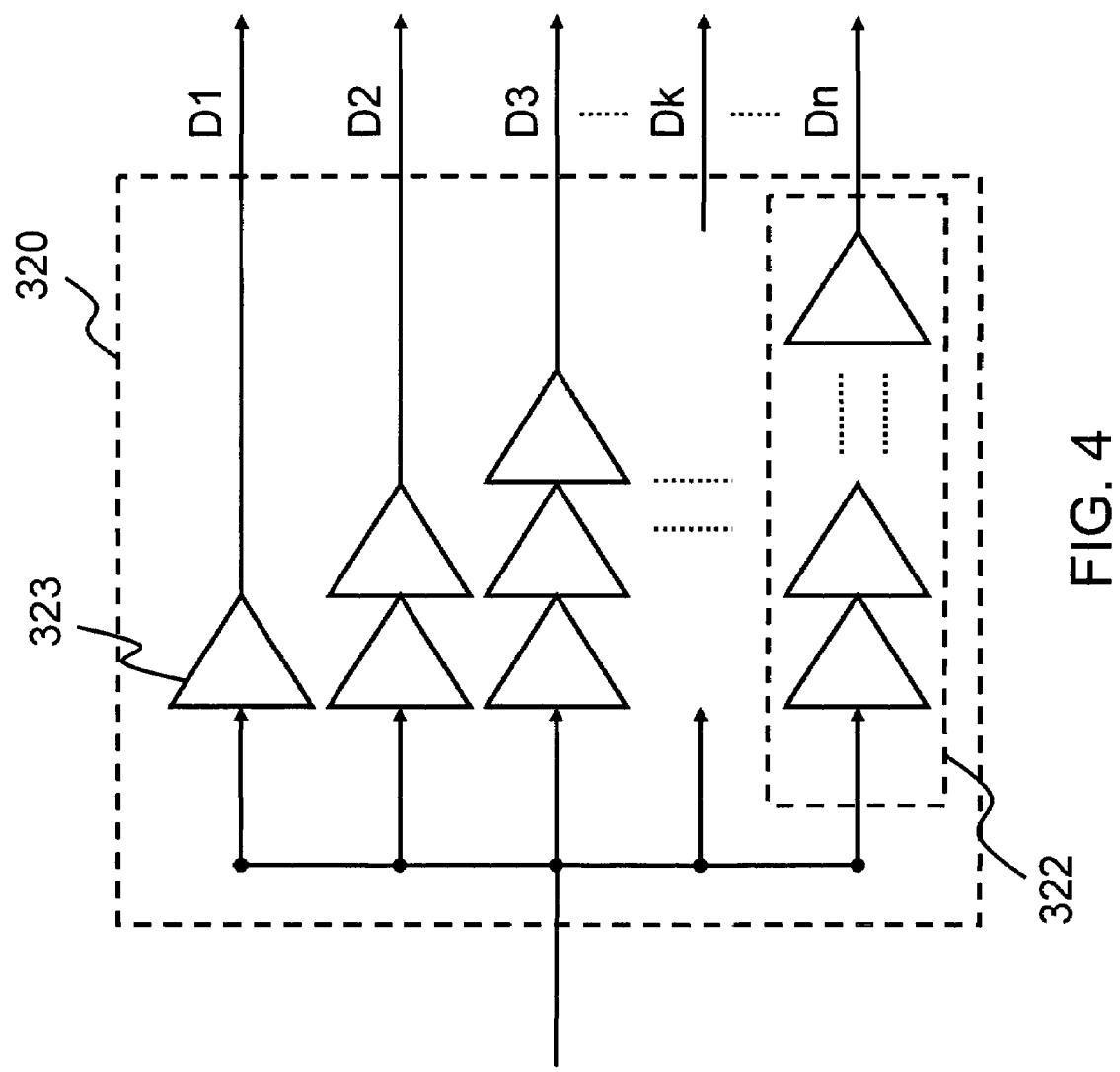
FIG. 4 is a structure diagram of an embodiment of the delay module in FIG. 3.

Further, as shown in FIG. 4, the delay module 320 comprises a plurality of digital delay lines 322 having at least one delay cell 323. Herein, the delay module 320 generates a plurality of delayed signals D1, D2, D3. . . Dk.

. . Dn, and then inputs them into the decision circuit 340. The delay time of each of the delayed signals D1 to Dn is different from each other, yet the time delay of each of the delay cells 323 is substantially the same. In an embodiment, the delay cell 323 is any element, logic unit or their combination, which are capable of generating the delay, and the most frequently used delay cell is the inverter. Generally speaking, the area of the inverter can be 10 times smaller than that of the voltage controlled delay cell. In a preferred embodiment, each delay cell 323 is the inverter such that the overall size of the apparatus is significantly reduced.

Figure 5:
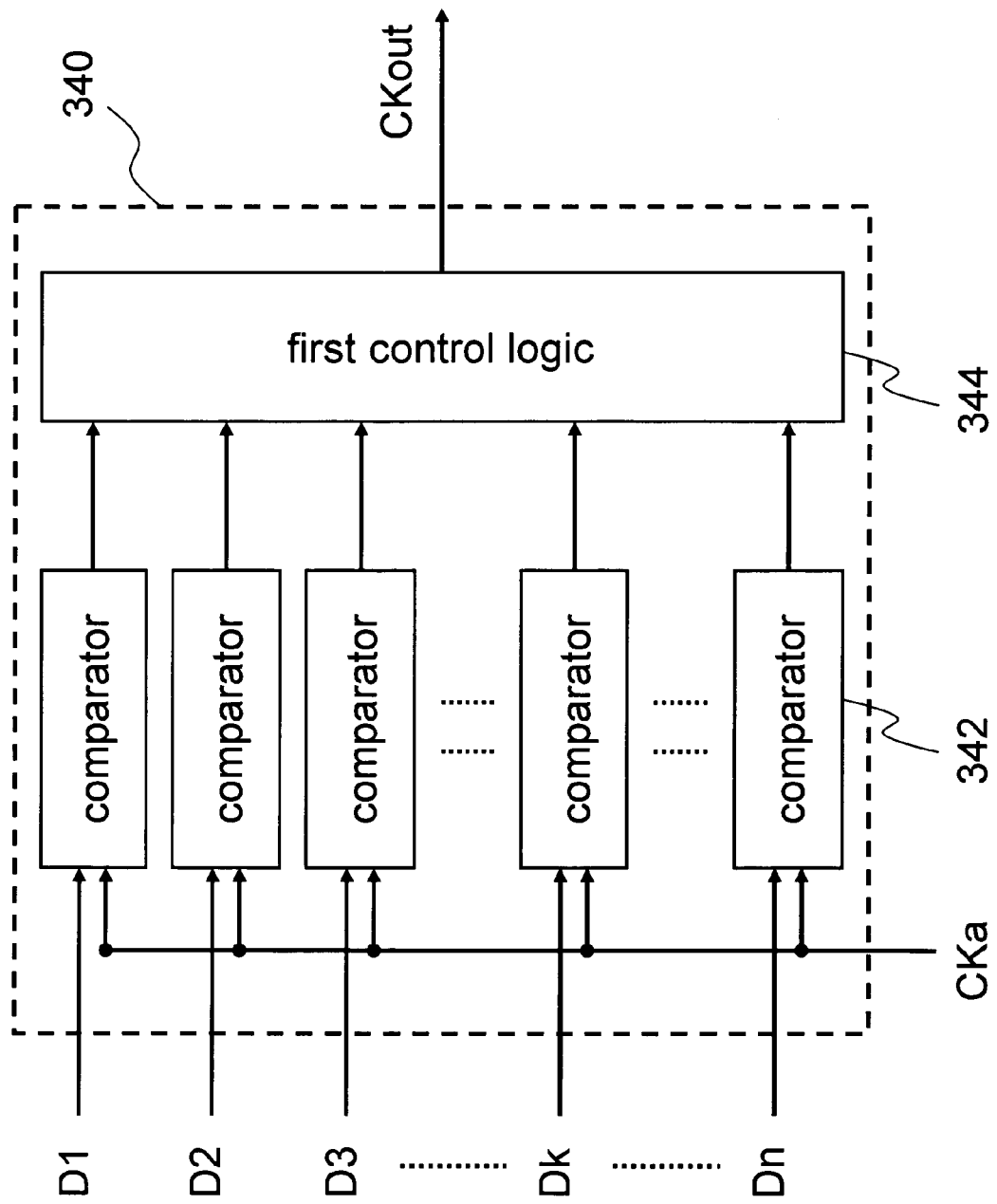
FIG. 5 is a structure diagram of an embodiment of the decision circuit in FIG. 3.

The decision circuit 340 compares the delayed signals D1 to Dn with the delayed clock CKa, to obtain the relative relation between the delay time and the predetermined phase, and then outputs an output signal CKout based on the relative relation. As shown in FIG. 5, the decision circuit 340 includes a plurality of comparators 342 and a first control logic 344. Each of the delayed signals D1 to Dn is inputted into the corresponding comparator 342 respectively. Meanwhile, the comparator 342 compares one of the delayed signals D1 to Dn with the delayed clock CKa, thereby obtaining the relative relation between the delay time of each delay cell 323 and the known phase difference (delay time) of the delayed clock CKa. Therefore, the first control logic 344 outputs the appropriate output signal CKout by means of the obtained relative relation.

In the above-mentioned embodiment, the clock signal generator further includes: a first multiplexer 330 for receiving a reference signal CKin and an input signal $CK_{DDR}$, and for outputting one of the reference signal CKin and the input signal $CK_{DDR}$ into the delay module 320. In other words, in this embodiment, the operation mode of the clock signal generator is classified as a first mode and a second mode, e.g. a working mode and an adjustment mode. The first multiplexer 330 chooses the reference signal CKin to input into the delay module 320 during the adjustment mode, and chooses the input signal $CK_{DDR}$ to input into the delay module 320 during the working mode.

In particular, with reference to FIGS. 3 to 5, when the clock signal generator according to the embodiment of the invention is in the adjustment mode, the delay circuit 310 generates a delayed clock CKa with 90° phase delay (delay time=¼ period of the reference signal CKin) according to the reference signal CKin, and then the first multiplexer 330 inputs the reference signal CKin to the delay module 320. Therefore, the n delayed signals D1 to Dn are generated from the reference signal CKin through the action of the respective delay lines 322 in the delay module 320. Subsequently, each of the n comparators 342 in the decision circuit 340 compares each one of the delayed signals D1 to Dn with the delayed clock CKa, to obtain the kth delayed signal Dk having its phase the closest to that of the delayed clock CKa, thereby acquiring the relative relations between the delay time duration of each of the delay cells 323 and the known phase difference of the delayed clock CKa. Accordingly, while in working mode, the first multiplexer 330 inputs the input signal $CK_{DDR}$ into the delay module 320, and then the first control logic 344 outputs the appropriate output signal CKout according to the relative relation. That is to say, suppose k is 10, i.e. after comparison it is obtained that the 10th delay signal $D_{10}$ and the phase diference of the delayed clock is 90°. Consequently, each of the delay cells 323 that causes a 9" phase delay is acquired. While in working mode, supposing that the output signal is required to have 36° phase delay, the first control logic 344 outputs the clock signal which is formed by the input signal $CK_{DDR}$ delayed with a 36° (9°×4) delayed phase by the fourth delay line.

Figure 7:
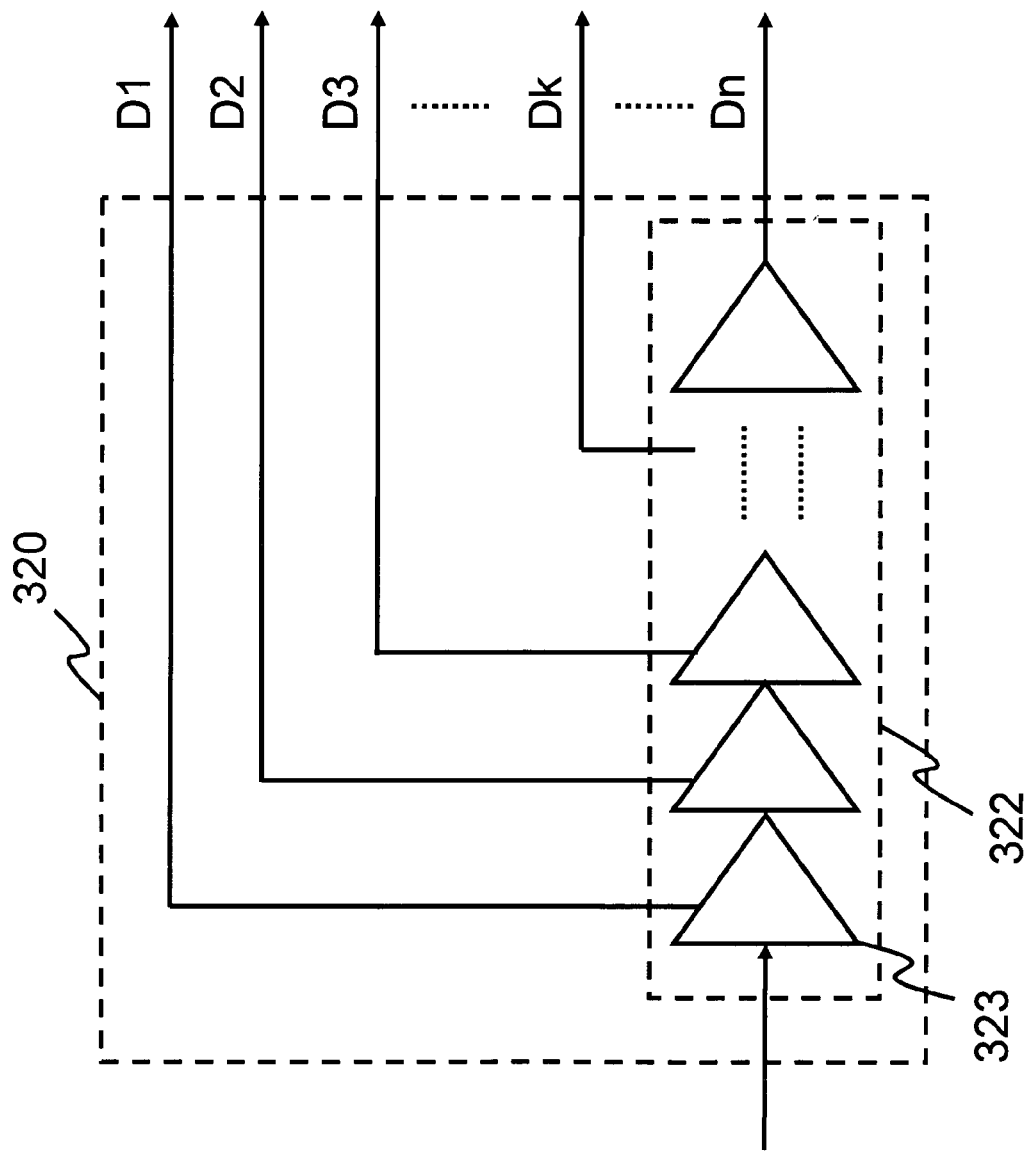
FIG. 7 is a structure diagram of another embodiment of the delay module in FIG. 3.

As shown in FIG. 7, another embodiment of the delay module 320 comprises a delay line 322, which is formed by a plurality of delay cells 323 connected in series. When the delay line 322 delays an input clock (i.e. the reference signal CKin or the second clock $CK_{DRR}$), each delay cell outputs a delayed signal separately, that is, each of the delayed signals D1 to Dn as mentioned above. Herein, the frequency of each delayed signal is substantially the same, but the phase of each it is substantially different. Similarly, the delay cell 323 may be any element, logic units or their combination, which provide delays, and among them, the inverter is most frequently utilized.

Figure 6:
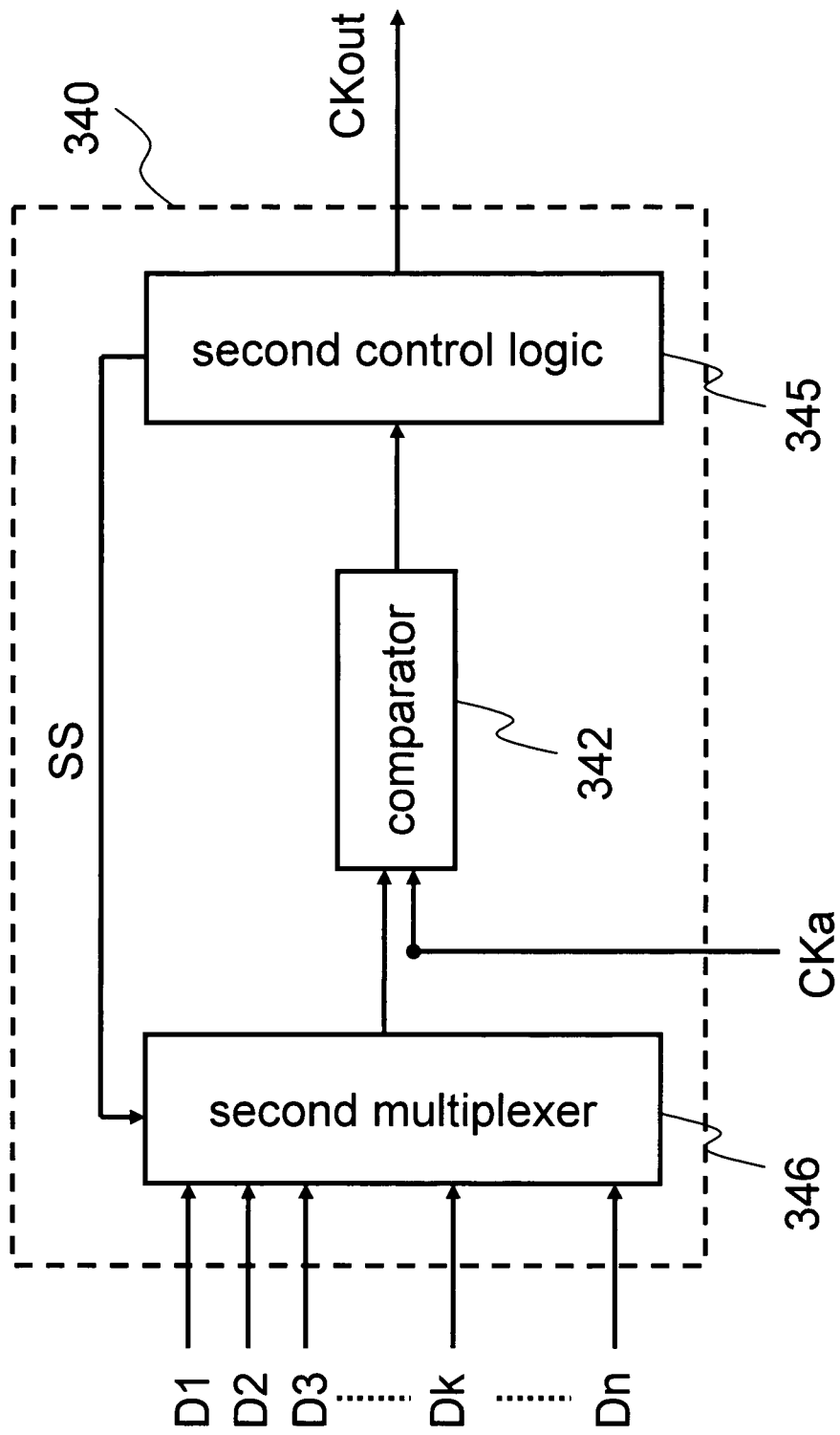
FIG. 6 is a structure diagram of another embodiment of the decision circuit in FIG. 3.

As shown in FIG. 6, another embodiment of the decision circuit 340 comprises: a second multiplexer 346, a comparator 342, and a second control logic 345. Referring to FIG. 6, the second multiplexer 346 receives the delayed signals D1 to Dn, and selects one of the delayed signals D1 to Dn based on a selection signal SS from the second control logic 345 to output it into the comparator 342. Then, the comparator 342 compares in sequence the input delayed signal with the delayed clock CKa, and output the comparison result in sequence to the second control logic 345. Subsequently, the second control logic 345 outputs an output signal CKout based on the comparison result.

In an embodiment, the clock signal generator is utilized to perform phase locked adjustment during the system idle time (i.e. in the adjustment mode), and the delay circuit is turned off after the adjustment is completed, that is, the delay circuit is turned off after the adjustment mode is completed, thereby significantly reducing the power consumption.

Furthermore, the clock signal generator and method thereof disclosed by the invention are suitable for being utilized in a system, such as a double data rate (DDR) memory, other type memory devices or other time sequential electronic devices.

Knowing the invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A signal generator, utilized in a system, for generating an output signal, the signal generator comprising:
   a delay circuit, for delaying a reference signal for a first time to generate a delayed clock;
   a delay module, comprising a plurality of delay cells, for delaying the reference signal by at least one of the delay cells to generate at least one delayed signal, wherein each delay cell has a substantially fixed delay time;
   a first multiplexer, coupled to the delay module, for selectively outputting the reference signal or an input signal to the delay module according to a mode of the system; and
   a decision circuit, coupled to the delay circuit and the delay module, for determining a relationship between the delay time of the delay cell and the first time of the delay circuit according to the delayed clock and the at least one delayed signal, and for controlling a delay time of the input signal based on the relationship to generate the output signal.

2. The signal generator of claim 1, wherein the first multiplexer outputs the input signal to the delay module, the delay module delays the input signal to output the delayed signals, and the decision circuit outputs one of the delayed signals based on the relationship.

3. The signal generator of claim 1, wherein the delay cell is an inverter.

4. The signal generator of claim 1, wherein the delay time of the input signal is the multiple of the delay time of the delay cell.

5. The signal generator of claim 1, wherein the delay times of the delay cells are substantially the same.

6. The signal generator of claim 1, wherein the delay circuit is disabled after the relationship is determined.

7. The signal generator of claim 1, wherein the decision circuit comprises:
   at least one comparator, for comparing the at least one delayed signal with the delayed clock to output a comparison result; and
   a control logic, coupled to the comparator, for obtaining the relationship based on the comparison result, and for controlling the delay time of the input signal based on the relationship to generate the output signal.

8. A signal generator, utilized in a system, for generating an output signal, the signal generator comprising:
   a delay circuit, for delaying a reference signal for a first time to generate a delayed clock;
   a delay module, comprising a plurality of delay cells, for delaying the reference signal by at least one of the delay cells to generate at least one delayed signal, wherein each delay cell has a substantially fixed delay time; and
   a decision circuit, coupled to the delay circuit and the delay module, for determining a relationship between the delay time of the delay cell and the first time of the delay circuit according to the delayed clock and the at least one delayed signal from the delay module, and for controlling a delay time of an input signal based on the relationship, to generate the output signal;
   wherein the relationship is determined in an idle mode of the system.

9. The signal generator of claim 8, wherein the delay circuit is disabled after the relationship is determined.

10. The signal generator of claim 8, wherein the delay time of the input signal is the multiple of the delay time of the delay cell.

11. The signal generator of claim 8, wherein the delay times of the delay cells are substantially the same.

12. A signal generator, utilized in a system, for generating an output signal, the generator comprising:
   a delay circuit, for delaying a reference signal for a first time to generate a delayed clock;
   a delay module comprising a plurality of delay cells, for delaying the reference signal by at least one of the delay cells to generate at least one delayed signal, wherein each delay cell has a substantially fixed delay time; and
   a decision circuit, coupled to the delay circuit and the delay module, for determining a relationship between the delay time of the delay cell and the first time of the delay circuit according to the delayed clock and the at least one delayed signal from the delay module, and for controlling a delay time of an input signal based on the relationship to generate the output signal;
   wherein the delay circuit includes one of a delay locked loop (DLL) and a phase locked loop (PLL).

13. The signal generator of claim 12, wherein the delay circuit is disabled after the relationship is determined.

14. The signal generator of claim 12, wherein the relationship is determined in an idle mode of the system.

15. A method, utilized in a system, for generating an output signal, the method comprising:
   generating a delayed clock by delaying a reference signal for a first time;
   generating a delayed signal by delaying the reference signal for at least one delay time;
   determining a relationship of the delay time and the first time according to the delayed signal and the delayed clock;
   receiving an input signal; and
   adjusting a delay time of the input signal according to the relationship to generate the output signal;
   wherein the relationship is determined in an idle mode of the system.

16. The method of claim 15, further comprising: stopping the step of generating the delayed clock after the relationship is determined.

17. A method, utilized in a system, for generating an output signal, the method comprising:
   generating a delayed clock by delaying a reference signal for a first time;
   generating a delayed signal by delaying the reference signal for at least one delay time;
   determining a relationship of the delay time and the first time according to the delayed signal and the delayed clock;
   receiving an input signal;
   adjusting a delay time of the input signal according to the relationship to generate the output signal; and
   stopping the step of generating the delayed clock after the relationship is determined.

18. A method, utilized in a system, for generating an output signal, comprising:
   in a first mode of the system, providing a delayed clock with a first delay time and at least one delayed signal with at least one delay time;
   in the first mode of the system, determining a relationship between the first delay time of the delayed clock and the delay time of the delayed signal according to the delayed signal and the delayed clock;
   in a second mode of the system, controlling a delay time of an input signal according to the relationship to generate the output signal; and
   in the second mode of the system, stopping providing the delayed clock.

19. The method of claim 18, wherein the first mode is an idle mode.

20. The method of claim 18, wherein the second mode is a working mode.

* * * * *